US00RE38057E

(19) United States
(12) Reissued Patent
Pandozy

(10) Patent Number: US RE38,057 E
(45) Date of Reissued Patent: Apr. 1, 2003

(54) COMBINED THERAPEUTIC EXERCISE APPARATUS FOR THE BACK

(76) Inventor: Raphaele Martini Pandozy, 280 Lafayette St., Apt. 2A, New York, NY (US) 10012

(21) Appl. No.: 09/853,155

(22) Filed: May 10, 2001

Related U.S. Patent Documents

Reissue of:
(64) Patent No.: 6,015,370
Issued: Jan. 18, 2000
Appl. No.: 08/854,178
Filed: May 29, 1997

(51) Int. Cl.[7] ..... A63B 21/06
(52) U.S. Cl. ..... 482/97; 482/137; 482/138; 482/140; 482/142
(58) Field of Search ..... 482/94, 97, 100, 482/176, 137, 138, 140, 142

(56) References Cited

U.S. PATENT DOCUMENTS 5,605,525 A * 2/1997 Johnston ..... 482/142
5,839,998 A * 11/1998 Wilkinson ..... 482/140

* cited by examiner

*Primary Examiner*—John Mulcahy
(74) *Attorney, Agent, or Firm*—Morgan L. Crow P.E.

(57) ABSTRACT

An apparatus and a method for combiningly performing four important exercises localized to the lower back with the addition of weight resistance: a) the rotation or torsion of the lower spine and the lower back muscles; b) the bending of the spine forward and the exercising of abdominal muscles; c) the bending of the spine rearward and the exercising of the lumbar and erector muscles; d) the stretching and self-postural adjustment of the spine. The user performs the four exercises in the horizontal position with both legs in raised position. A swinging member accommodates the legs and allows the swinging, side-to-side motion of the legs. A second pivotal member helps the bending of the pelvis forward and rearward. A roller support assembly supports and massages the entire back during exercises. The user's body rests on an anatomical cushion support during exercises. The body's user experiences both the stretching of the intravertebral ligament and cartilage, while building postural awareness and self-adjusting spinal posture.

31 Claims, 9 Drawing Sheets

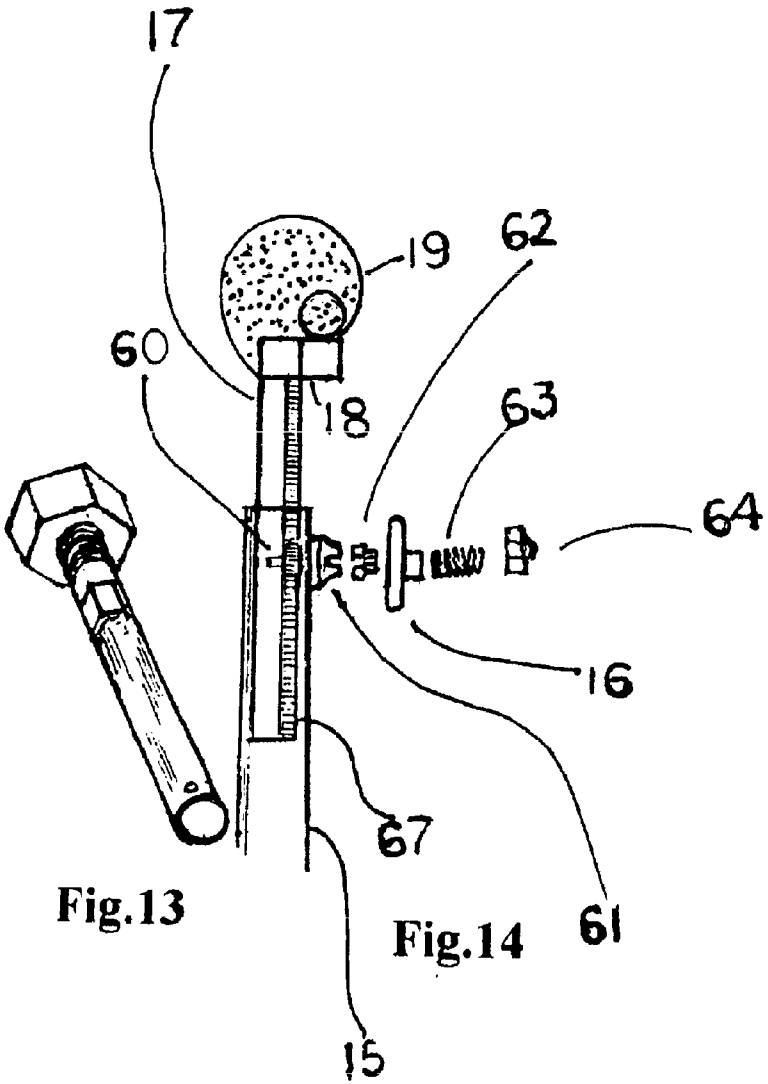
Fig.14
Fig.13
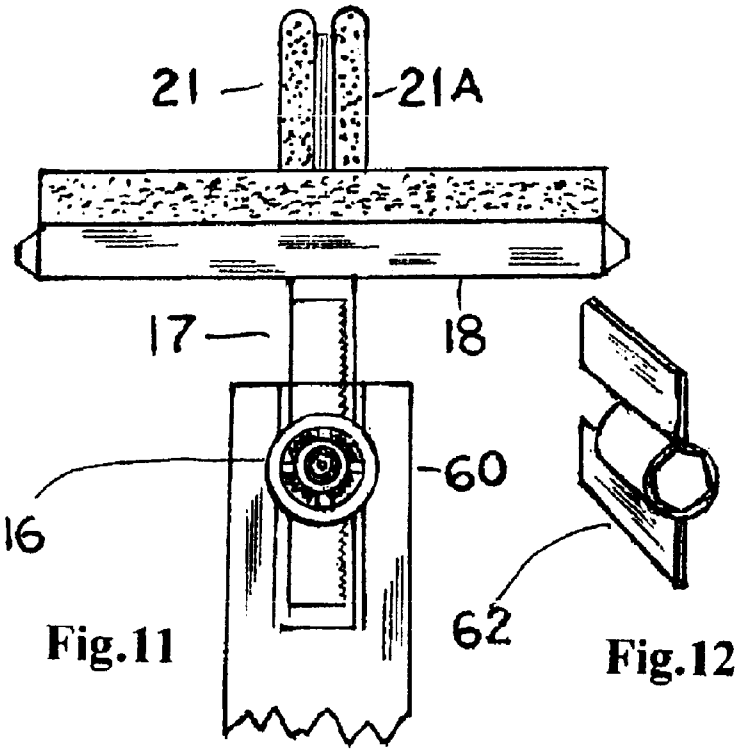
Fig.12
Fig.11

COMBINED THERAPEUTIC EXERCISE APPARATUS FOR THE BACK

Matter enclosed in heavy brackets [ ] appears in the original patent but forms no part of this reissue specification; matter printed in italics indicates the additions made by reissue.

REFERENCE TO A MICROFICHE APPENDIX
(Not Applicable)

CROSS REFERENCE TO RELATED APPLICATIONS
Disclosure Document No. 414416 Feb. 18, 1997

STATEMENT REGARDING FEDERALLY SPONSORED RESEARCH OR DEVELOPMENT
(Not Applicable)

BACKGROUND OF INVENTION

1. Field of Invention

Referring to disclosure Document No. 414416, of Feb. 18, 1997, this invention concerns an apparatus specifically designed to offer four combined, gentle, yet effective, exercise movements for:

a) The immediate relief from back muscle pain and tension;

b) The improvement of rotary, frontal and posterior mobility of the pelvis;

c) The improvement of general flexibility of the spine;

d) The strengthening and developing of spinal, abdominal and lumbar muscles;

e) The spinal awareness and posture self-correction.

f) The improvement of blood circulation throughout the back of the body.

2. Description of the Related Prior Art

More than 90 Million Americans suffer from some form of back pain. Most common pathologies are located in the lower back of the body. To date, there is no comprehensive exercising fitness or therapeutic apparatus that can rehabilitate the back, effectively relieve pain, muscle tension and stiffness, especially of the lower back region—often under tension or left inactive, due to bad posture and lack of exercise.

There are basically three exercise movements accomplished by existing devices and apparatuses for helping with back problems, but they are often ineffective and counterproductive. They are:

i) The rotation of the torso or the twisting movement of the spine;

ii) The frontal bending of the torso (so-called "stomach crunch");

iii) The posterior bending of the torso (so-called "back extension"); and iv) The spinal posterior flexion (so-called "spinal arching").

While all four movements are intended for exercising the abdominal and lumbar muscles as well as providing flexibility to the spine, wrong application of force to the spine, vertebral compression, and the lack of protection for the natural curvature of the spine forced by these devices, substantially reduce the therapeutic benefits of the exercises. Moreover, devices designed to achieve pelvis mobility also have detrimental effects by putting unnecessary strain on the pelvis and on the spinal column as a whole.

Alternatively, these four movements can be seen from a different perspective and improved. The device can accommodate the body in such way as for the exercises to be performed naturally and non-strenuously. These movements are therapeutically beneficial when they are localized, when stress and friction especially to the weakest point of the back are removed. The exercise device should provide gradual, gentle aid toward self-rehabilitation, toward repairing or rebuilding muscle and cartilage fibers of the spine.

i) All devices currently used for therapeutic purposes, designed for torso rotation exercises that force this movement to the spine against some resistance, both in the standing position, such as U.S. Pat. No. 4,296,924 (Anzaldua et al) and in the sitting position, such as U.S. Pat. No. 4,456,245 (Baldwin); U.S. Pat. No. 4,733,860 (Staffee); U.S. Pat. No. 5,230,680 (Wu) have questionable therapeutic effects for the following reasons:

A) In such positions all vertebrae of the spine are under compression by the gravitational weight of the head, which accounts for almost ⅔'s of one's body weight. Thus damage may result to cartilage, ligaments, contributing to the deterioration of arthritis-affected vertebrae, and to intervertebral slipped disk in the worst of cases;

B) In virtually all apparatuses that offer this type of exercise, the initial force of the rotation is initiated by the arms and shoulders instead by isolated action of the lower muscles themselves. This is a way to transfer the arms' entire force to the lower back which becomes the fulcrum, thus causing stress to vertebral cartilage and ligaments.

C) There is nothing in these devices that provides support and proper posture during rotation, i.e., that assures the ideal gravitational position of the spine, allowing it to transfer the weight of the head to the ground effortlessly without vertebral friction.

ii) There is currently no therapeutic device that specifically helps pelvis mobility by isolating pelvis movement. Virtually all devices in existence are designed to to exercise and to strengthen the abdominal muscles by offering resistance to the forward and rearward motion of the torso, without taking into account the natural dynamics of the body:

a) No mobility therapy of the pelvis and no flexibility therapy of the spine can be achieved under vertebral compression of and muscle stress;

b) Being the force initiated by the shoulders, the pelvis becomes the fulcrum, namely, the central exertion point;

c) Indeed, abdominal and lumbar muscles need no expansion, but firmness and flexibility. In the first and most common instance, as in athlete's cases, when abdominal muscles are stronger, but are not compensated by lumbar erector muscles, especially under excessive stress, an imbalance may bring about muscles spasms; in the second and less common instance when both the abdominal and lumbar muscles are out of shape or inactive, rupture or hernia problems may occur.

Such are the following devices: U.S. Pat. No. 4,500,089 (Jones); U.S. Pat. No. 5,256,126 (Grotstein); U.S. Pat. No. 5,441,473 (Safani et al); U.S. Pat. No. 4,627,619 (Rockwell et al); U.S. Pat. No. 4,623,144 (Rockwell); etc.

iii) Virtually, all devices currently used for therapeutic purposes, intended to exercise and to strengthen the lower back lumbar and spinal muscles by offering resistance to rearward movement of the torso, such as those cited above (ii), although less risky, may still produce likewise damages:

a) Some devices do offer a back rest, but it is often set at shoulder level, while support is needed for the lower backs. Prima Facie an exception could be made for U.S. Pat. No. 5,070,863 (Mc Arthur et al) which has two pivotal axes and two hip attachments, but the uncoordinated articulation of the two eventually contributes to stress even more the lower muscles and vertebral joints;

b) Being the point of contact located in the shoulder area, excessive exertion leverage and stress is again transferred to the lower spine's weakest points;

c) Finally, being this movement naturally initiated by the upper muscles of the neck and shoulders excessive force is applied to the cervical vertebrae.

iv) Virtually all devices currently used for therapeutic purposes, designed to arch the spinal column with the application of mechanical force, may produce adverse effects. Such are U.S. Pat. No. 5,549,534 (Parviavien); U.S. Pat. No. 5,176,706 (Lee); U.S. Pat. No. 5,324,247 (Lepley); U.S. Pat. No. 3,640,272 (Hussey); U.S. Pat. No. 2,660,999 (Thornton).

a) Presently, there are no sufficient scientific applicable data that support the use of corrective mechanical means to restore cartilage support and elasticity. Cartilage cannot be repaired easily. Corrective spinal practices and cartilage regeneration must therefore be gradual and self-perpetuated. The application of corrective mechanical force can only account for risk of spinal deterioration. The natural curvature of the spine and spine flexibility can be achieved in most cases with exercises that use the body's weight and the body's capacity to correct itself through spinal awareness, as in yoga practice.

c) Physical awareness is basically a spontaneous memory that is built by repetitive, gentle action to the interested part of the body. There is virtually no therapeutic apparatus or device that helps achieve spinal awareness, in ways for the subject to build such a subconscious memory to attempt self-correction of spinal posture.

BRIEF SUMMARY OF THE INVENTION

The Combined Therapeutic Exercise Apparatus for the Back (CTEAB) fills important needs in this era of fitness science. It overcomes several deficiencies of the existing therapeutic exercise devices developed so far. In sum, the apparatus features a gentle and soothing combination of four back exercises that instantly relieve most symptoms of stiffness, muscle spasms, which can be organized into an effective therapy program for back recovery and rehabilitation.

The apparatus offers eight novel and important features which are the objects of invention with respect to the four basic back exercises:

The 1st feature consists in the novel approach of back exercising that allows the user to perform the four basic exercises from an ideal position of the body, and that is, by lying down on a horizontal position, on the anatomically shaped cushioning of the bench's main frame; isolating and localizing the exercise action on the most commonly affected area, namely, the lower back, by having both legs raised, resting on the adjustable leg-rest and having the feet resting on the adjustable foot-rest.

In this position all muscles of the body are relaxed; all gravity forces that compress the vertebrae or stress the muscles, in the standing or sitting positions, are eliminated; the body's own weight allows the spine to rest with anatomically correct posture. In addition, the blood circulation, due to the raised legs, is also improved.

The 2nd feature consists in providing a leg swinging mechanism that allows a localized lower back rotation exercise, starting not from the shoulder, but from the lower back muscles and from the pelvis themselves, free from vertebral compression, for greater muscles movement, spinal flexibility and pelvis mobility.

The exercise, so performed, is gentle, yet very effective. The force applied on the lower back is better felt and better controlled by the subject when all the vertebrae of the spine are relieved of the gravitational, compressive force.

The resistance to the lumbar muscles is provided by a frontal stack of weights, which gradually may induce additional work, seen as fiber-force producing and exertion+ contraction. The effectiveness of the exercise consists in the repetitive progressive sequences executed preferably in slow motion. The exercise engages the outer thigh muscles the iliotibial bands and the inner abductors. More in particular, the force is localized in the deep erectors, the sacro spinales, the posterior layers of the lumbar region and with progressive diminution in the longissimus thoracis, the iliocostalis, and upwards from the lumbar triangle to the oblique externs, the serratus, the spleniuses trasversus, and the trapezoids. The important task of the swinging mechanism is that it exercises all muscles of the back with force originating from the lower back itself, thus harmoniously producing alternatively force and counterforce.

This gentle, free exercise also stretches, with proportionate action, the ligaments and cartilage of all 33 vertebrae of the spine, in likewise manner from the pelvis to the skull, especially when the subject proceeds in turning the head 90 degrees, to the opposite side at each swing of the legs. The stretching of intervertebral cartilage, of the spinal nerve and of the entire sympathetic and parasympathetic nerve system, has a soothing effect and an immediate relief to pain and stiffness. Muscle spasms, due to strain, common to most athletes, are in this way quickly eliminated and in most cases, athletes may resume the sport activity almost immediately unless fiber rupture has occurred.

The 3rd feature consists in providing a pivotal lever mechanism with swiveling weight stacks for exercising all the muscles of the lower back and to help pelvis mobility, risk free from hernia problems.

Performed with common devices, a similar exercise of bending the torso forwardly when considerably weight resistance is applied, known as the "stomach crunch," in the wrong position and without proper protection, may be very detrimental to the lower back muscles. With the CTEAB, this exercise is greatly improved because performed with legs in elevated position and because proper spinal support is provided. The pivoting mechanism, having its axis directly below the pelvis, greatly contributes to the body's natural dynamics, to muscle synchrony and to obtain the most benefits out of the torso bending exercise.

The 4th feature consists in providing a pivotal lever exercise mechanism that allows the swiveling of the weight stacks forwardly for increased pelvis mobility; for safe and effective lumbar and spinal erector muscles rehabilitation and development, risk free from rupture and hernia problems, since the spine curvature during the exercise is properly supported and both the subject's legs are in a raised position. With the stacks in the forward position, gravity force helps towards greater mobility of the pelvis, while strengthening the back lumbar and erector muscles during the return to the resting position. (After this exercise the subject can better bend over to touch his/her toes).

The 5th feature is providing a padded adjustable roller assembly with springs to support and massage the neck muscles; as well as to protect the delicate cervical vertebrae during the lower back bending forward and extension exercises.

The 6th feature is providing a set of roller embodiment with springs to suit all body sizes, anatomically juxtaposed, for spinal curvature and muscle support during the bending forward and back extention exercises; for massaging the entire back; for building spinal awareness; and for self-correction of spinal posture. Thus a gentle pressure against the spine is exercised from the neck down to the pelvis area—pressure being proportionate to the amount of weight applied on the stacks.

The 7th feature is providing an anatomical cushioning device that accommodates the buttocks and the lower back, providing back support during said movements, yet gently stretching intervertebral cartilage and ligaments for spinal postural correctness and flexibility.

The 8th feature is providing said set of roller embodiment for improved blood circulation and a general well-being that massages the entire back.

BRIEF DESCRIPTION OF THE DRAWINGS

This brief description of the drawing establishes the order adopted in the following Detailed Description of the Invention: The drawings show the following:

FIG. 11 shows the elevation of leg rest bar adjustment.

FIG. 12 shows the sliding fly-wheel of the leg rest's adjusting and locking mechanism.

FIG. 13 shows the partly round and partly hexagonal shaft of the leg rest's adjusting and locking leg mechanism.

FIG. 14 Shows a side elevation of the leg rest mechanism and the singular parts of the adjusting and lock mechanism.

DETAILED DESCRIPTION OF THE INVENTION

Figure 1:
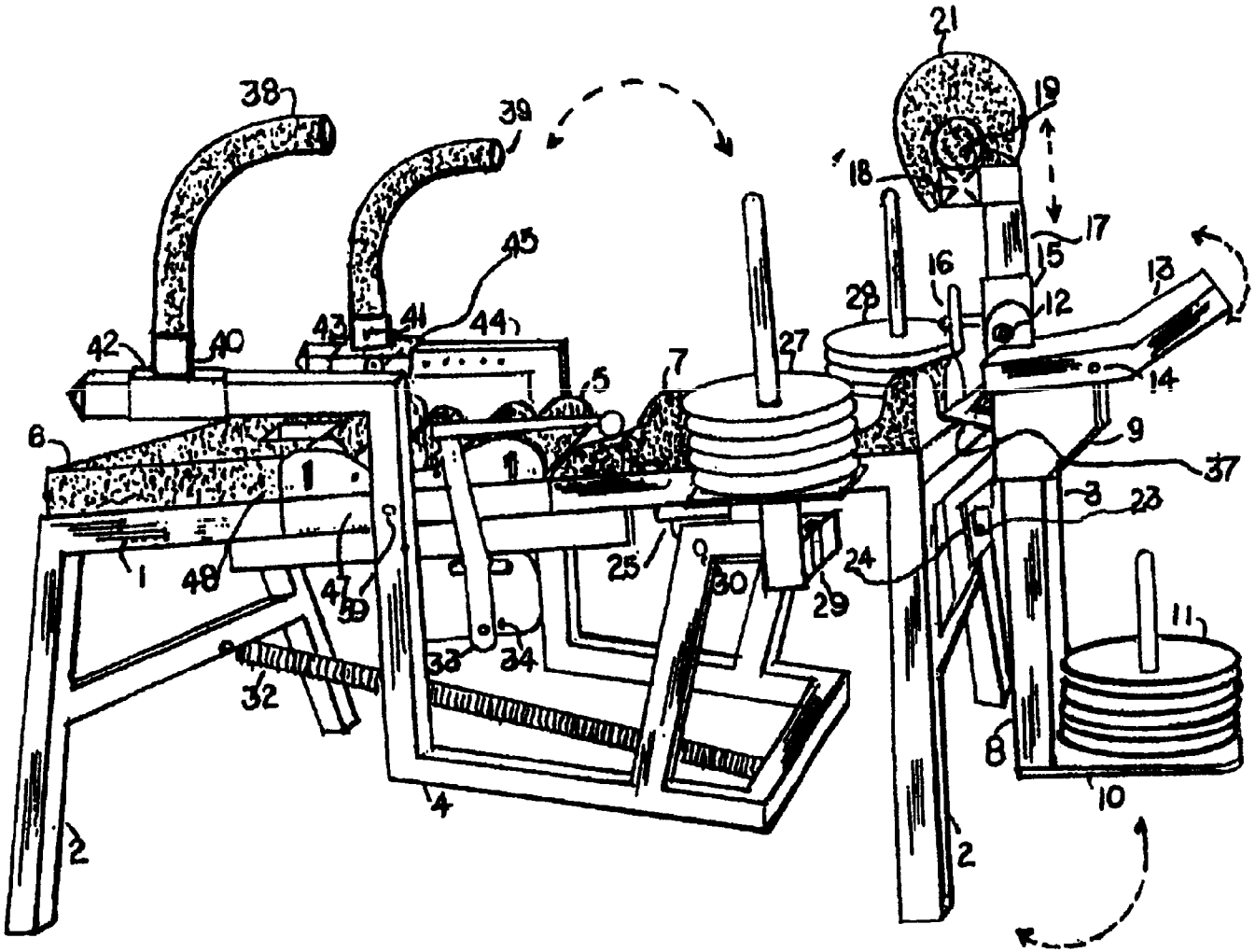
FIG. 1 shows a general, perspective view of the rest position of the Combined Therapeutic Back Apparatus, as well as all its major parts visible from the right side.
Figure 2:
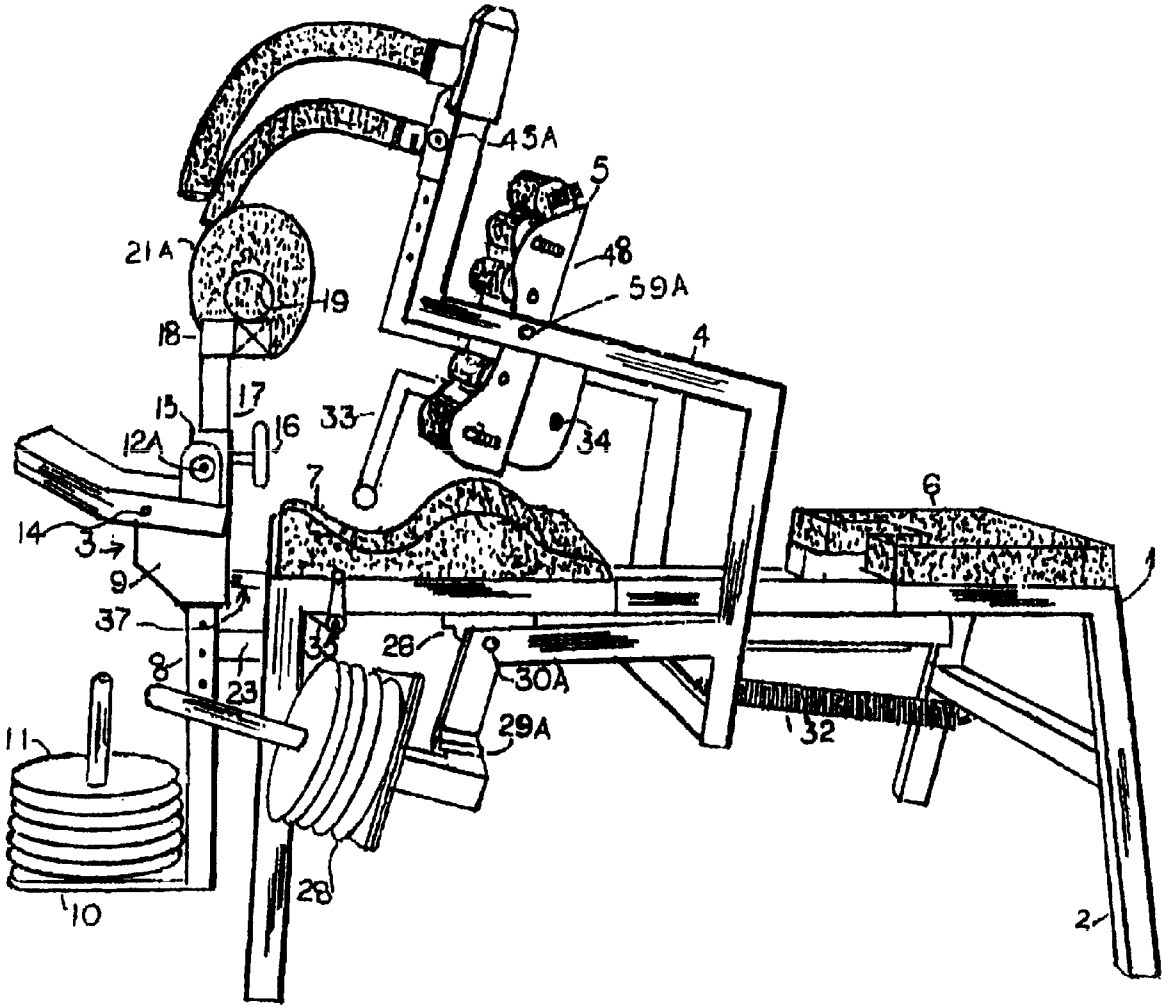
FIG. 2 shows a general perspective view of the second movement, namely, the motion of the lever pivoting mechanism of the CTEAB, as well as its major parts visible from the lefts side.
Figure 3:
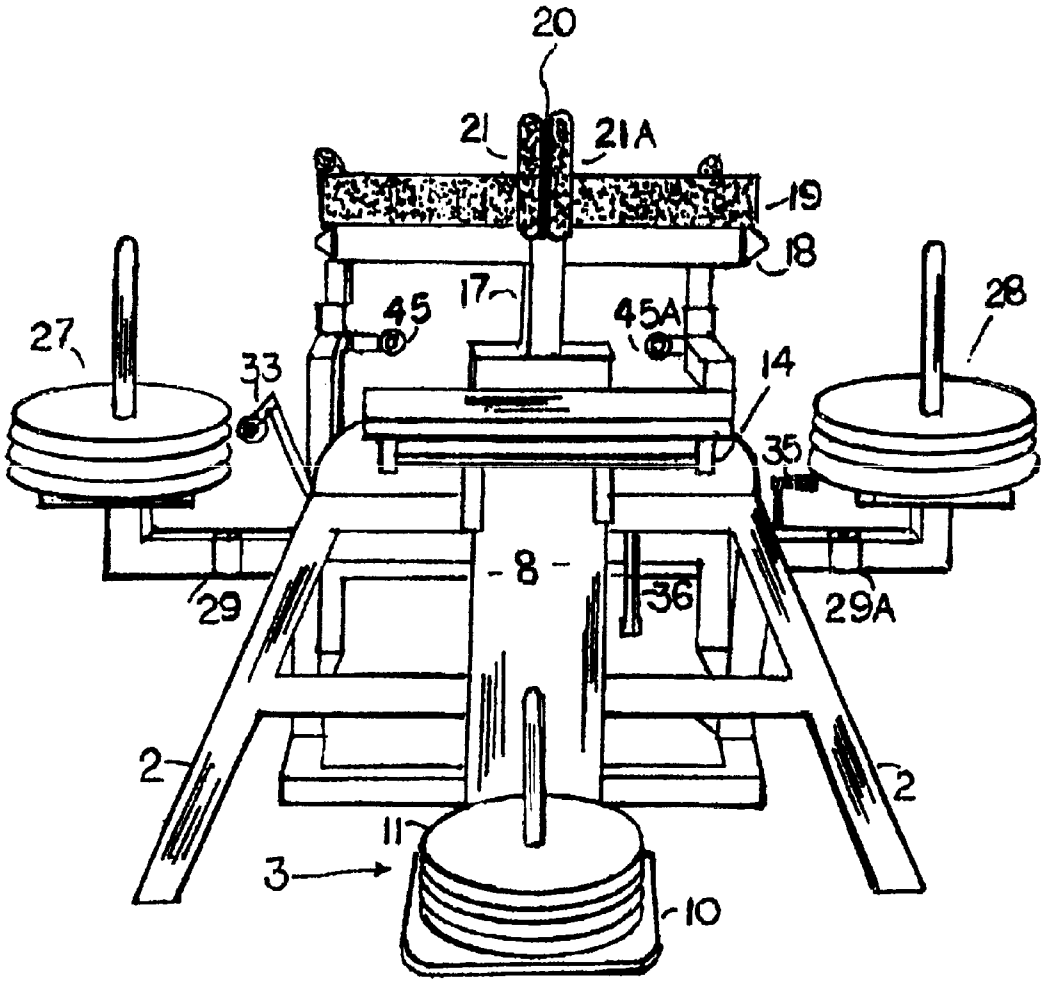
FIG. 3 shows a general perspective view of the rest position of the CTEAB, as well as its major parts visible from the front side.

Referring to FIG. 1 the CTEAB can be divided in four major embodiments of parts: A) The bench frame 1; B) The frontal swinging mechanism 3; C) The pivoting mechanism 4; and D) The back roller support assembly 5.

A) The bench frame 1, standing on four saw-horse shaped legs 2, is made out of 2" square steel tubing. It accommodates the other three embodiments and the stationary parts, such as a rear padded member 6, and a front padded, anatomical, postural member 7.

B) The swinging mechanism 3 allows the localized lower back rotation exercise isolating the lower back muscles, since it is performed with legs raised and the body lying on the padded, anatomical, postural member 7. It comprises of a vertical steel channel member lined with a chrome sleeve 8, for aesthetic reasons and for easy sliding of the adjustable footrest assembly 9. At the lower end of the steel channel a plate steel offers the housing for the weight stack 11. Moving upwards, we have a foot rest assembly which comprises of a frame 9 to fit and to slide over the channel vertical member 8, to provide adjustment for the user, and to lock in place with the help of spring pins 12 and 12A. The actual foot rest base 13 also hinges on a shaft 14 to provide a more comfortable resting angle for the user. Alongside, in the inside center of the channel vertical member 8, a square tubular member 15 is attached to house the leg rest adjusting mechanism which is visible in FIG. 14, comprising of a spur gear 60 and a rack 67, a shaft partly round and partly hexagonal, FIG. 13, a groove base bushing 61, an engaging and locking flywheel 62, a hand wheel 16, a spring 63 and a nut 64. Attached one to the other, the flywheel 62 and the hand wheel 16 engage the shaft FIG. 13 and the spur 60 when the user pulls and turns the hand wheel 16, which allows the leg rest mechanism to slide vertically for leg adjustment to suit the user. The leg rest mechanism comprises a main vertical square tubing shaft 17 welded to a horizontal cross section tubing 18 that provides the basis for the round cushion 19 on which the legs of the user rest during the four exercises. At the center of the horizontal of the leg rest bar 18, a vertical metal plate 20 is welded in order to provide a fastening base for the pair of small cushions 21 and 21A that receive the action from the legs of the user.

A horizontal steel axle 23 welded onto the channel vertical member 8 connects the entire swinging mechanism to the main frame 1 by means of a flange bearing 24 that allows the movement. A locking mechanism comprising of a handle 35, a lever 36 and a U shaped metal plate 37 allows the user to lock the swinging mechanism 3 in order to switch to the second and third exercise.

C) The pivoting lever mechanism 4 comprises a steel frame that attaches to and is allowed to pivot by a pair of pillow block bearings 25 and 26 on both sides of the frame. A pair of weight stacks 27 and 28 are erected on either side of the mechanism. Both stacks are hinged directly on the supporting frame 29 and 29A allowing the swiveling of same and thus furnishing the resistance for the two exercises: the forward back bending and the back bending exercises.

When the weight stacks 27 and 28 are swiveled toward the rear, the second exercise can be accomplished. The mechanism 4 gravitating on its axles 30 and 30A is allowed to remain in the rest position, thus providing resistance for the user to move it forward, while the return movement is accomplished effortlessly.

When the weight stacks 27 and 28 are swiveled toward the front, the third exercise can be accomplished. The user is helped by gravity to bend forward, while having to provide the force to return the mechanism to the rest position.

Additional resistance and balance for the rest position is provided by a resilient member 32. A locking mechanism comprising of a lateral, horizontal lever 33, connected to a spring pin 34, allows the user to pass from the pivoting lever exercise, back to the swinging exercise.

A pair of arched and padded handle bars 38 and 39 are mounted on swiveled housings 40 and 41, which in turn are attached on to a pair of sliding square tubing 42 and 43 that allow the handle bars to adjust by along the holed horizontal bars 44, and to lock in place with the help of two spring pins 45 and 45A.

Figures 4, 5, 6:
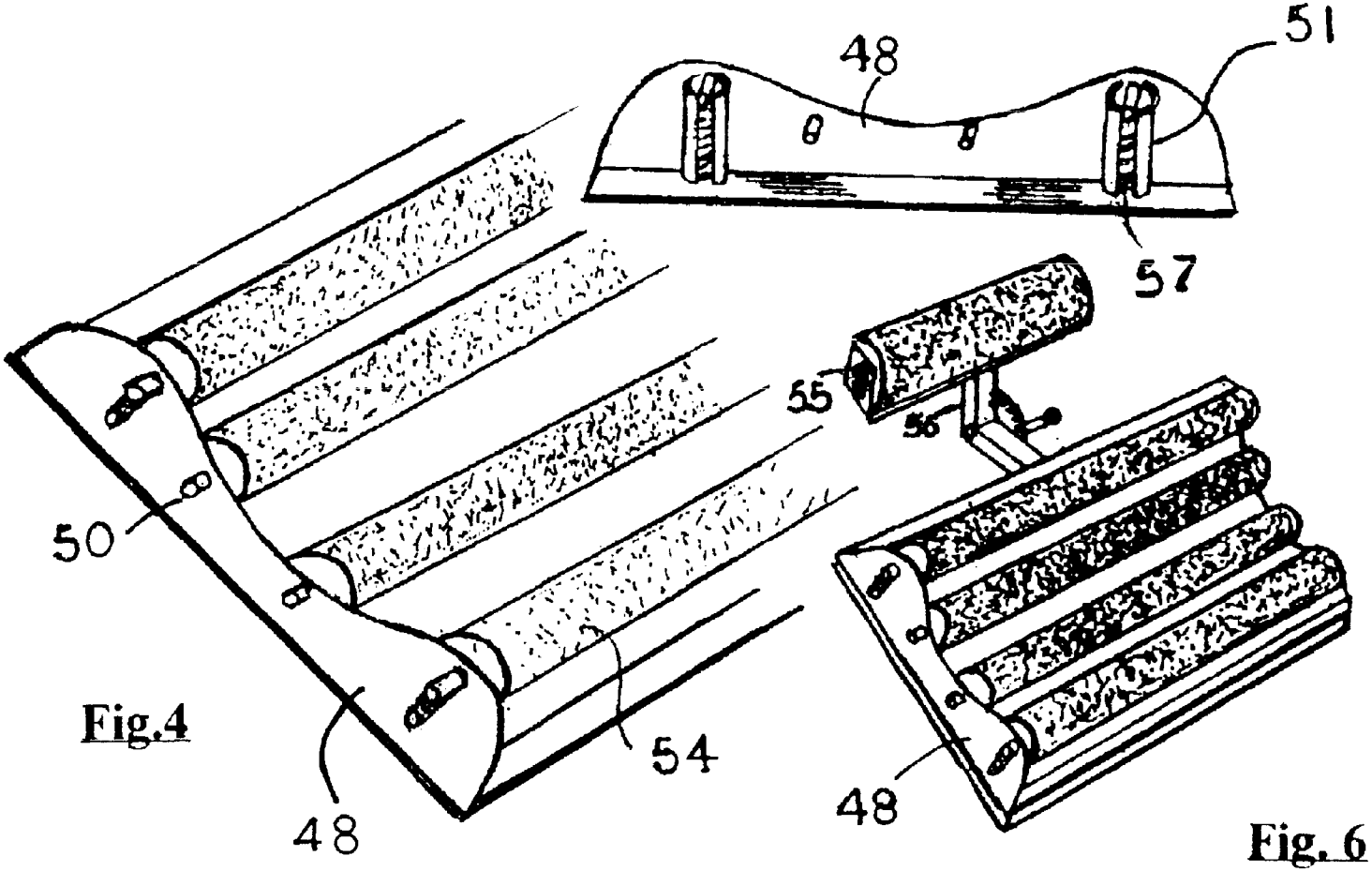
FIG. 4 shows a view of CTEAB's roller back support.
FIG. 5 shows a detail view of spring application of the CTEAB's roller support embodiment.
FIG. 6 shows a view of the complete back and neck support of CTEAB's roller embodiment.

D) The back roller support embodiment 5 comprises a basic square frame 47 to fit and to fill its bench frame housing 65. A pair of anatomically L shaped iron members 48 provide the bases for the four rollers 54 and the rollers' shafts 50, as well as the spring housings 51, the springs 57, shown in FIG. 5. This spring roller assembly has been designed to follow the contour of the user's spine, both for support, for spinal awareness, and for improving blood circulation during the second and third exercise. A smaller assembly for the support of cervical vertebrae and neck muscles is attached to the main back roller embodiment 5. The neck roller assembly comprises an individual base frame 55, FIG. 6 which houses the roller axles, and springs, not visible in the drawing, but similar to that of the main roller embodiment, a tubular steel extension 56 that attaches to the frame 47 of main roller embodiment 5 with screws. Ultimately, the back support roller embodiment 5 is mounted on the pivoting mechanism axle 59 and 59A in order to permit its rotary motion during the second and the third exercise.

SUMMARY OF OPERATION

The user lies in a horizontal position on the bench's main frame, holding onto the two adjustable, swiveling, handle bars 38 and 39, rolling the body forward on roller assembly 47, lifting and resting both legs on the adjustable, leg-rest member 19, and feet resting on the adjustable foot rest member 13. All adjustments can be executed in this position. The user can pull and turn adjusting means 16, raise or lower leg rest bar 18, that automatically locks itself in the desired leg position, subsequently sliding handle bars 38 and 39 to desired length position and locking them with the help of spring pin 45 and 45A.

In this position all muscles of the body are relaxed; all gravity forces that compress the vertebrae or stress the muscles, in the standing or sitting positions, are eliminated; the body's own weight allows the spine to rest on the padded, anatomically postural corrective member 7.

Figure 7:
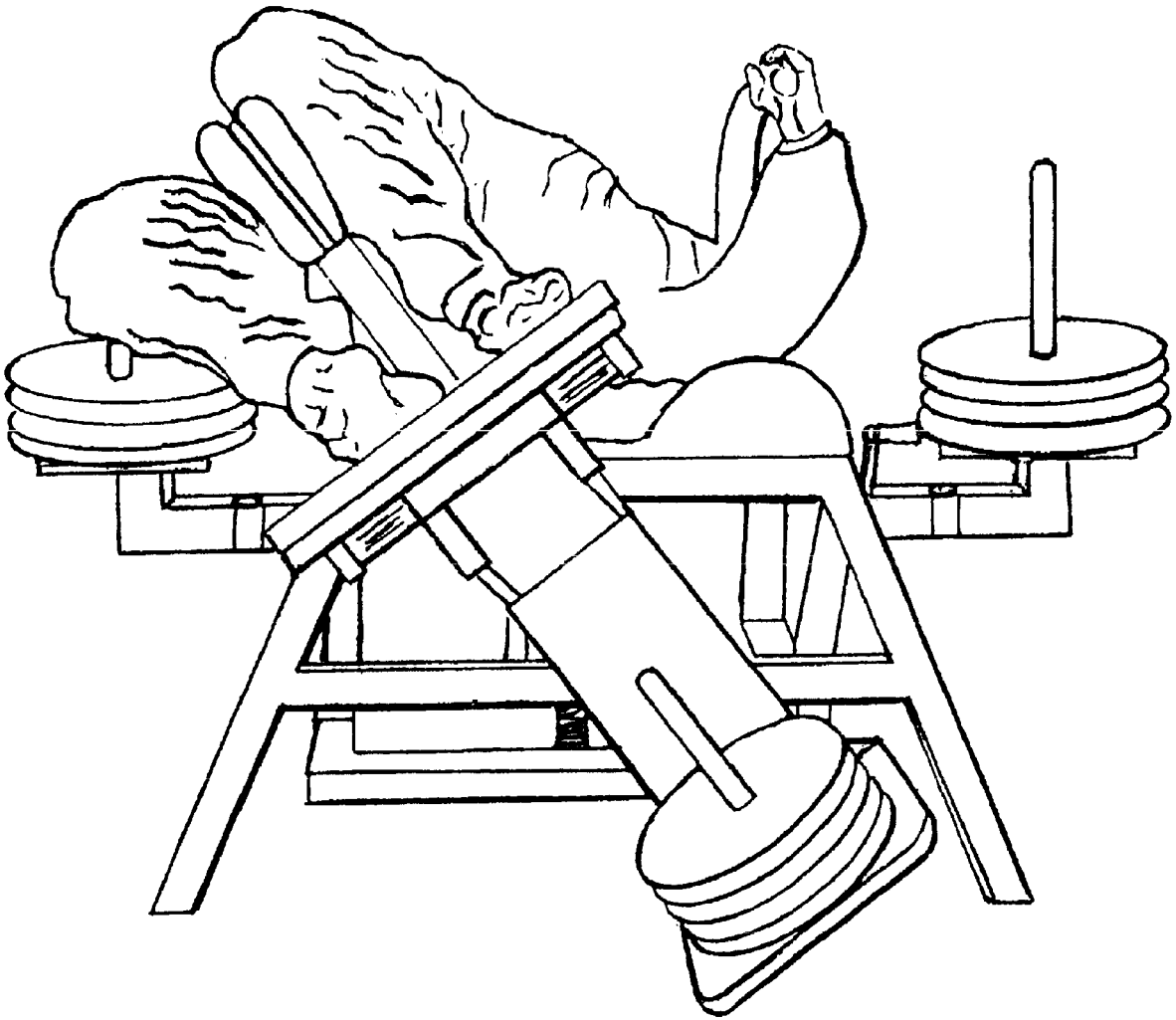
FIG. 7 shows a user's frontal view and the movement (toward the right) of CTEAB' swinging mechanism.
Figure 8:
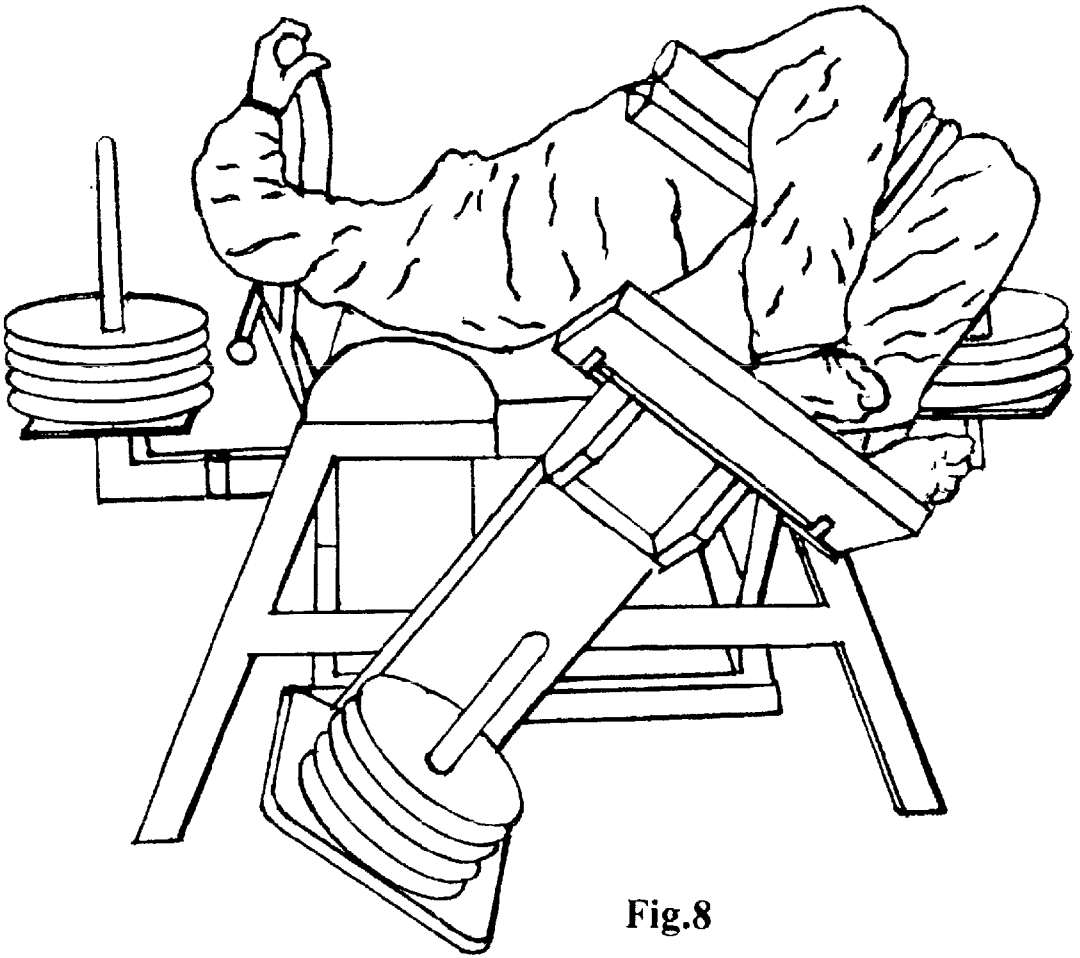
FIG. 8 shows a user's frontal view and the movement (toward the left) of CTEAB' swinging mechanism.

The challenges of all therapeutic exercises is to perform same from an ideal resting position, to isolate and to localize muscle action. This is the way the CTEAB accomplishes this goal. The user may begin the back rotation exercise, holding, both knees together, sandwiching the vertical padded members 21 and 22. The user moves both legs side ways with the help of the swinging mechanism as shown in FIG. 7 and FIG. 8. No strain should be experienced, just sense of well being and relaxation.

After completing sufficient repetitions of the same movement, the user, still remaining in the same horizontal position with both legs raised, may act on lever 35 and lock the swinging mechanism 4.

Figure 9:
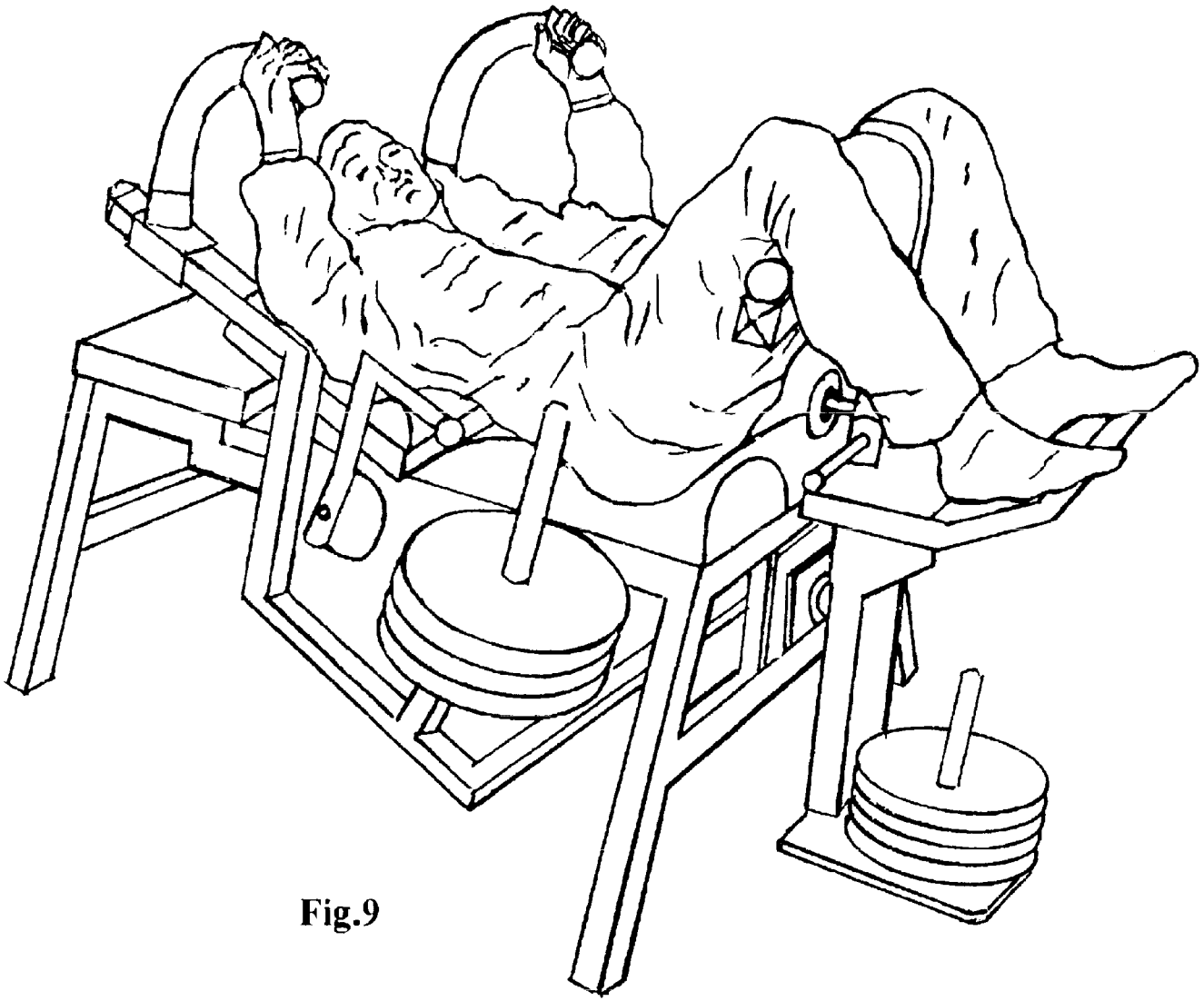
FIG. 9 shows a right view of the initial movement (toward the front) of CTEAB's lever pivoting mechanism.
Figure 10:
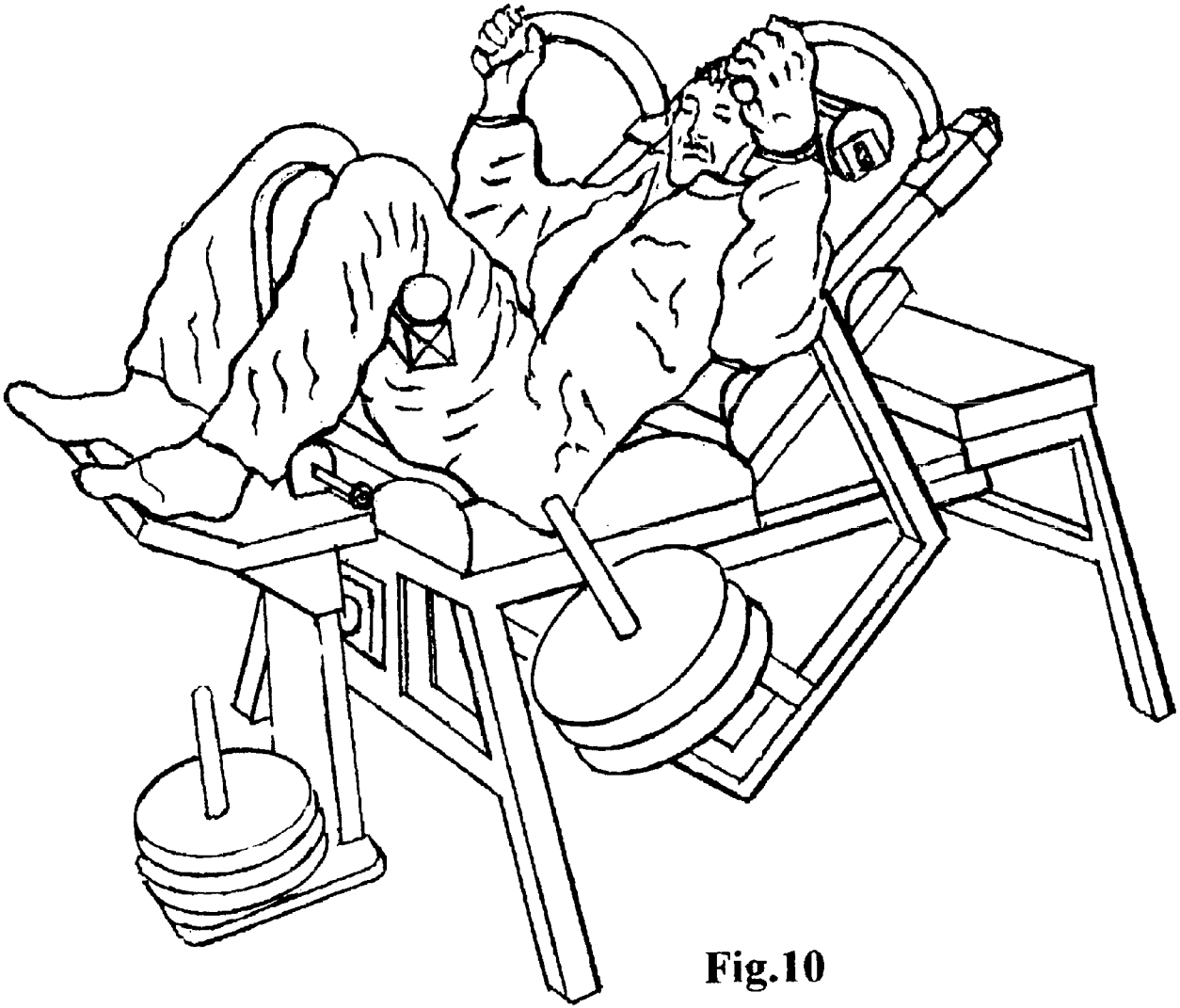
FIG. 10 shows a left view of the advanced movement (toward the left) of CTEAB's lever pivoting mechanism.

In order to pass to the second exercise, the user must now swivel the pair of weight stacks 27 and 28 toward the rear and disengage the lever pivoting mechanism 4 by acting on the lever 33. The movement is described in FIG. 9 and FIG. 10. At the end of the exercise, the user must lock the lever pivoting mechanism 4 again by acting on lever 33.

In order to pass to the third exercise, the user must swivel the weight stacks 27 and 28 toward the front and again unlock the lever pivoting mechanism by acting on lever 33. At the end of the exercise, the user must lock the lever pivoting mechanism again acting on lever 33 in order to exit.

The back roller support assembly 5 needs no adjustments. The pressure exercised against the back is proportionate to the gravity force applied on the pivoting mechanism 4.

What is claimed is:

1. A therapeutic exercise apparatus for the back, comprising:

a bench for supporting the user in a reclined position;

a leg swinging mechanism comprising a swinging member having an intermediate portion pivotally attached a forward end of the bench for rotation about a first horizontal axis, a lower portion having means for holding a weight resistance such that swinging movement of the swinging member is resisted, and an upper portion having a leg rest for engaging a user's legs behind the knees and a foot rest for receiving their feet;

a pivoting lever having an intermediate portion pivotally attached to a side of the bench for rotation about a second horizontal axis transverse to the first, a forward portion having a second means for holding a weight resistance such that forward and rearward movement of the pivoting lever are selectively resisted, and a rearward portion having handle bars and a pivoting support for receiving the user's back.

2. The therapeutic exercise apparatus of claim 1, wherein the bench includes padding at its forward and rearward ends.

3. The therapeutic exercise apparatus of claim 2, wherein the padding at the forward end of the bench is anatomically shaped.

4. The therapeutic exercise apparatus of claim 1, further comprising a mechanism for adjusting the position of the foot rest along the swinging member.

5. The therapeutic exercise apparatus of claim 1, wherein the foot rest is pivotally attached to the swinging member.

6. The therapeutic exercise apparatus of claim 1, further comprising a mechanism for adjusting the distance between the leg rest and the first axis.

7. The therapeutic exercise apparatus of claim 6, wherein the leg rest adjusting mechanism comprises a spur gear and a rack.

8. The therapeutic exercise apparatus of claim 1, wherein said means for holding a weight resistance comprises a rod for holding a stack of weights.

9. The therapeutic exercise apparatus of claim 1, wherein the pivoting lever comprises a frame that is pivotally attached to both sides of the bench.

10. The therapeutic exercise apparatus of claim 1, wherein the handle bars are arched.

11. The therapeutic exercise apparatus of claim 1, further including a mechanism for adjusting the position of the handle bars along the pivoting lever.

12. The therapeutic exercise apparatus of claim 1, wherein the pivoting back support comprises a pivoting frame and a plurality of rollers attached thereto.

13. The therapeutic exercise apparatus of claim 12, wherein the rollers are supported by springs.

14. The therapeutic exercise apparatus of claim 12, further comprising a roller for receiving the neck of the user.

15. The therapeutic exercise apparatus of claim 1, further comprising a swing member locking mechanism for locking the swing mechanism in place.

16. The therapeutic exercise apparatus of claim 1, further comprising a pivoting lever locking mechanism for locking the pivoting lever in place.

17. The therapeutic exercise apparatus of claim 1, further comprising a resilient resistance member attached to the pivoting lever and the bench.

18. The therapeutic exercise apparatus of claim 1, wherein the leg rest comprises a padding for engaging a user's legs both behind the knees and between the knees.

19. The therapeutic exercise apparatus of claim 1, wherein the second means for holding a weight resistance comprises a weight stack holder hinged to the pivoting lever for moving a weight stack between a rearward position for resisting forward movement of the lever and a forward position for resisting rearward movement of the lever.

*20. A method of abdominal and lumbar exercise comprising the following steps by a user:*

*providing an exercise machine including*

*a bench for supporting the user in a reclined position;*

*a leg swinging mechanism comprising a swinging member having an intermediate portion pivotally attached a forward end of the bench for rotation about a first horizontal axis, a lower portion having means for holding a weight resistance such that swinging movement of the swinging member is resisted, and an upper portion having a leg rest for engaging a user's legs behind the knees and a foot rest for receiving their feet;*

*a pivoting lever having an intermediate portion pivotally attached to a side of the bench for rotation about a second horizontal axis transverse to the first,*

*a forward portion having a second means for holding a weight resistance such that forward and rearward movement of the pivoting lever are selectively resisted, and*

*a rearward portion having handle bars and a pivoting support for receiving the user's back*

*and wherein the second means for holding a weight resistance comprises a weight stack holder hinged to the pivoting lever for moving a weight stack between a rearward position for resisting forward movement of the lever and a forward position for resisting rearward movement of the lever;*

*engaging the user's legs on said leg rest;*

*engaging user's feet with said foot rest;*

*lying on said bench of said exercise machine in a reclined position; and*

*swinging the user's legs about said horizontal axis.*

*21. The method abdominal and lumbar exercise according to claim 20 comprising an additional step after the step of lying on said exercise machine in a reclined position, comprising:*

*elevating at least a portion of both of the user's legs.*

*22. A method of abdominal and lumbar exercise comprising the following steps by a user:*

*providing an exercise machine, including:*

*a bench for supporting the user in a reclined position;*

*a leg swinging mechanism comprising a swinging member having an intermediate portion pivotally attached a forward end of the bench for rotation about a first horizontal axis, a lower portion having means for holding a weight resistance such that swinging movement of the swinging member is resisted, and an upper portion having a leg rest for engaging a user's legs behind the knees and a foot rest for receiving their feet;*

*a pivoting lever having an intermediate portion pivotally attached to a side of the bench for rotation about a second horizontal axis transverse to the first,*

*a forward portion having a second means for holding a weight resistance such that forward and rearward movement of the pivoting lever are selectively resisted, and*

*a rearward portion having handle bars and a pivoting support for receiving the user's back*

*and wherein the second means for holding a weight resistance comprises a weight stack holder hinged to the pivoting lever for moving a weight stack between a rearward position for resisting forward movement of the lever and a forward position for resisting rearward movement of the lever;*

*moving said weight rearward to said rearward position for resisting forward movement of the lever;*

*lying on said bench of said exercise machine in a reclined position;*

*grasping said handle bars; and*

*pulling forward with the torso against said lever.*

*23. The method abdominal and lumbar exercise according to claim 22 comprising an additional step after the step of lying on said exercise machine in a reclined position, comprising:*

*elevating at least a portion of both of the user's legs.*

*24. The method of abdominal and lumbar exercise according to claim 22 wherein the step of providing an exercise machine includes said pivoting back support comprising a pivoting frame and a plurality of rollers attached thereto for massaging the user's back during the step of pulling forward with the torso against said lever.*

*25. The method of abdominal and lumbar exercise according to claim 22 wherein the step of providing an exercise machine includes said pivoting back support further comprises a roller for receiving the neck of the user for massaging the user's back during the step of pulling forward with the torso against said lever.*

*26. A method of abdominal and lumbar exercise comprising the following steps by a user:*

*providing an exercise machine comprising:*

*a bench for supporting the user in a reclined position;*

*a leg swinging mechanism comprising a swinging member having an intermediate portion pivotally attached a forward end of the bench for rotation about a first horizontal axis, a lower portion having means for holding a weight resistance such that swinging movement of the swinging member is resisted, and an upper portion having a leg rest for engaging a user's legs behind the knees and a foot rest for receiving their feet;*

*a pivoting lever having an intermediate portion pivotally attached to a side of the bench for rotation about a second horizontal axis transverse to the first, horizontal axis, operably connected to said bench and,*

*a forward portion having a second means for holding a weight resistance such that forward and rearward movement of the pivoting lever are selectively resisted,*

*a rearward portion having handle bars and a pivoting support for receiving the user's back; and*

*wherein the second means for holding a weight resistance comprises a weight stack holder hinged to the pivoting lever for moving a weight stack between a rearward position for resisting forward movement of the lever*

*and a forward position for resisting rearward movement of the lever;*

*lying on said bench of said exercise machine in a reclined position;*

*engaging the user's legs on said leg rest;*

*engaging user's feet with said foot rest;*

*elevating at least a portion of both of the user's legs;*

*moving said weight forward to said forward position for resisting rearward movement of the bench; and*

*pushing back with the torso against said bench.*

*27. The method of abdominal and lumbar exercise according to claim 26 wherein the step of providing an exercise machine includes said pivoting back support further comprising a pivoting frame and a plurality of rollers attached thereto for massaging the user's back during the step of pushing back with the torso against said bench.*

*28. The method of abdominal and lumbar exercise according to claim 26 wherein the step of providing an exercise machine includes said pivoting back support comprising a pivoting frame and a plurality of rollers attached thereto and further comprising a roller for receiving the neck of the user for massaging the user's back during the step of pushing back with the torso against said bench.*

*29. A method of abdominal and lumbar exercise comprising the following steps by a user:*

*providing an exercise machine comprising:*

*a bench for supporting the user in a reclined position;*

*a leg swinging mechanism comprising a swinging member having an intermediate portion pivotally attached to a forward end of the bench for rotation about a first horizontal axis, a lower portion having means for holding a weight resistance such that swinging movement of the swinging member is resisted, and an upper portion having a leg rest for engaging a user's legs behind the knees and a foot rest for receiving their feet;*

*a pivoting lever operably connected to said bench and having an intermediate portion pivotally attached to a side of the bench for rotation about a second horizontal axis transverse to the first,*

*a forward portion having a second means for holding a weight resistance such that forward and rearward movement of the pivoting lever are selectively resisted, and*

*a rearward portion having handle bars and a pivoting support for receiving the user's back*

*and wherein the second means for holding a weight resistance comprises a weight stack holder hinged to the pivoting lever for moving a weight stack between a rearward position for resisting forward movement of the lever and a forward position for resisting rearward movement of the lever;*

*lying on said bench of said exercise machine in a reclined position;*

*moving said weight forward to said forward position for resisting rearward movement of the bench; and*

*pushing back with the users torso against said bench.*

*30. The method of abdominal and lumbar exercise according to claim 29 wherein the step of providing an exercise machine includes said pivoting back support comprising a pivoting frame and a plurality of rollers attached thereto for massaging the user's back during the step of pushing back with the users torso against said bench.*

*31. The method of abdominal and lumbar exercise according to claim 29 wherein the step of providing an exercise machine includes said pivoting back support comprising a pivoting frame and a plurality of rollers attached thereto and further comprising a roller for receiving the neck of the user for massaging the user's back during the step of pushing back with the torso against said bench.*

* * * * *